United States Patent
Jo et al.

(10) Patent No.: US 12,540,356 B2
(45) Date of Patent: Feb. 3, 2026

(54) FLOURESCENT PROTEIN COMPOSITION FOR DNA SEQUENCE ANALYSIS AND METHOD FOR DNA SEQUENCE ANALYSIS USING SAME

(71) Applicant: SOGANG UNIVERSITY RESEARCH FOUNDATION, Seoul (KR)

(72) Inventors: Kyubong Jo, Seoul (KR); Seonghyun Lee, Seoul (KR); Jihyun Park, Gyeonggi-Do (KR); Eunji Shin, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 763 days.

(21) Appl. No.: 17/901,028

(22) Filed: Sep. 1, 2022

(65) Prior Publication Data
US 2023/0136510 A1    May 4, 2023

Related U.S. Application Data (63) Continuation of application No. 16/427,438, filed on May 31, 2019, now Pat. No. 11,466,322.

(30) Foreign Application Priority Data
Dec. 13, 2018 (KR) .......................... 10-2018-0161115

(51) Int. Cl.
C07K 14/47    (2006.01)
C12Q 1/6876   (2018.01)

(52) U.S. Cl.
CPC ................... C12Q 1/6876 (2013.01)

(58) Field of Classification Search
None
See application file for complete search history.

(56) References Cited

U.S. PATENT DOCUMENTS

2010/0055701 A1    3/2010    Tong et al.
2012/0164754 A1    6/2012    Rhee

FOREIGN PATENT DOCUMENTS

| KR | 10-2012-0071191 A | 7/2012 |
| KR | 10-2016-0115553 A | 10/2016 |
| KR | 10-2018-0097956 A | 9/2018 |

OTHER PUBLICATIONS

Van Mameren, J., et al.; "Unraveling the structure of DNA during overstretching by using multicolor, single-molecule fluorescence imaging", PNAS Oct. 27, 2009, vol. 106, No. 43, pp. 18231-18236.
Park, J., et al.; "Single-molecule DNA visualization using AT-specific red and non-specific green DNA-binding fluorescent proteins", Analyst, 2019, 144, 921-927.
Lee, S., et al.; "Investigation of various fluorescent protein-DNA binding peptides for effectively visualizing large DNA molecules", RSC Adv., 2016, 6, pp. 46291-46298.
Office Action (Non-Final) from corresponding U.S. Appl. No. 16/427,438, issued on Jul. 6, 2021.
Office Action (Final) from corresponding U.S. Appl. No. 16/427,438, issued on Dec. 13, 2021.
Advisory Action from corresponding U.S. Appl. No. 16/427,438, issued on Feb. 15, 2022.
Office Action (Non-Final) from corresponding U.S. Appl. No. 16/427,438, issued on Mar. 7, 2022.
Notice of Allowance from corresponding U.S. Appl. No. 16/427,438, issued on Jun. 20, 2022.

*Primary Examiner* — Michael D Pak
(74) *Attorney, Agent, or Firm* — Harness, Dickey & Pierce, P.L.C.

(57) ABSTRACT

The present invention relates to a composition for DNA sequence analysis and a method for DNA sequence analysis, the method comprising treating a sample with the composition. The composition of the present invention can attain efficient optical identification at a single-DNA molecule level by linking both an A/T-specific DNA-binder agent and an A/T-non-specific complementary DNA-binder agent to DNA, and thus can be helpfully used in studying chromosomal organization of genomes, protein immunolocalization, and the like.

6 Claims, 5 Drawing Sheets

Specification includes a Sequence Listing.

SEQUENCE LISTING

Sequence total quantity: 19
SEQ ID NO: 1          moltype = DNA   length = 36
FEATURE               Location/Qualifiers

```
                        1..36
                        note = P1-HNS
source                  1..36
                        mol_type = other DNA
                        organism = synthetic construct
SEQUENCE: 1
acttcacata tgatgagcga agcacttaaa attctg                                 36

SEQ ID NO: 2            moltype = DNA   length = 37
FEATURE                 Location/Qualifiers
misc_feature            1..37
                        note = P2-HNS
source                  1..37
                        mol_type = other DNA
                        organism = synthetic construct
SEQUENCE: 2
gccaccagaa ccaccttgct tgatcaggaa atcgtcg                                37

SEQ ID NO: 3            moltype = DNA   length = 43
FEATURE                 Location/Qualifiers
misc_feature            1..43
                        note = P3-mCherry
source                  1..43
                        mol_type = other DNA
                        organism = synthetic construct
SEQUENCE: 3
caagcaaggt ggttctggtg gcatggtgag caagggcgag gag                         43

SEQ ID NO: 4            moltype = DNA   length = 36
FEATURE                 Location/Qualifiers
misc_feature            1..36
                        note = P4-mCherry
source                  1..36
                        mol_type = other DNA
                        organism = synthetic construct
SEQUENCE: 4
atttcaggat ccctacttgt acagctcgtc catgcc                                 36

SEQ ID NO: 5            moltype = DNA   length = 45
FEATURE                 Location/Qualifiers
misc_feature            1..45
                        note = P5-BRCA
source                  1..45
                        mol_type = other DNA
                        organism = synthetic construct
SEQUENCE: 5
tatgcacata tggtagagag taatattgaa gacaaaatat ttggg                       45

SEQ ID NO: 6            moltype = DNA   length = 48
FEATURE                 Location/Qualifiers
misc_feature            1..48
                        note = P6-BRCA
source                  1..48
                        mol_type = other DNA
                        organism = synthetic construct
SEQUENCE: 6
gctcaccata ccgccgctgc caccttttgg ccctctgttt ctacctag                    48

SEQ ID NO: 7            moltype = DNA   length = 36
FEATURE                 Location/Qualifiers
misc_feature            1..36
                        note = P7-eGFP
source                  1..36
                        mol_type = other DNA
                        organism = synthetic construct
SEQUENCE: 7
ggtggcagcg gcggtatggt gagcaagggc gaggag                                 36

SEQ ID NO: 8            moltype = DNA   length = 37
FEATURE                 Location/Qualifiers
misc_feature            1..37
                        note = P8-eGFP
source                  1..37
                        mol_type = other DNA
                        organism = synthetic construct
SEQUENCE: 8
tatgcaggat ccttacgcct tgtacagctc gtccatg                                37

SEQ ID NO: 9            moltype = DNA   length = 81
```

```
FEATURE             Location/Qualifiers
misc_feature        1..81
                    note = P9-HMG-mCherry
source              1..81
                    mol_type = other DNA
                    organism = synthetic construct
SEQUENCE: 9
atattgcata tgaccccgaa acgcccgcgc ggccgcccga aaaaaggcgg cagcggcggc    60
atggtgagca agggcgagga g                                              81

SEQ ID NO: 10       moltype = DNA   length = 84
FEATURE             Location/Qualifiers
misc_feature        1..84
                    note = P10-HMG-mCherry
source              1..84
                    mol_type = other DNA
                    organism = synthetic construct
SEQUENCE: 10
atattgggat ccttagccgc cgctgccgcc ttttttcggg cggccgcgcg ggcgtttcgg    60
ggtcttgtac agctcgtcca tgcc                                           84

SEQ ID NO: 11       moltype = DNA   length = 54
FEATURE             Location/Qualifiers
misc_feature        1..54
                    note = P11-(KW)2-mCherry
source              1..54
                    mol_type = other DNA
                    organism = synthetic construct
SEQUENCE: 11
atgttgcata tgaaatggaa atggaaaaaa gcgatggtga gcaagggcga ggag          54

SEQ ID NO: 12       moltype = DNA   length = 57
FEATURE             Location/Qualifiers
misc_feature        1..57
                    note = P12-(KW)2-mCherry
source              1..57
                    mol_type = other DNA
                    organism = synthetic construct
SEQUENCE: 12
atgttgggat ccttatttcc atttccattt tttcgccttg tacagctcgt ccatgcc       57

SEQ ID NO: 13       moltype = DNA   length = 56
FEATURE             Location/Qualifiers
misc_feature        1..56
                    note = P13-(KW)2-eGFP
source              1..56
                    mol_type = other DNA
                    organism = synthetic construct
SEQUENCE: 13
atgttgcata tgaaatggaa atggaaaaaa gcgatgcgtg agcaagggcg aggagc        56

SEQ ID NO: 14       moltype = DNA   length = 57
FEATURE             Location/Qualifiers
misc_feature        1..57
                    note = P14-(KW)2-eGFP
source              1..57
                    mol_type = other DNA
                    organism = synthetic construct
SEQUENCE: 14
atgttgggat ccttatttcc atttccattt tttcgccttg tacagctcgt ccatgcc       57

SEQ ID NO: 15       moltype = DNA   length = 83
FEATURE             Location/Qualifiers
misc_feature        1..83
                    note = P15-HMG-eGFP
source              1..83
                    mol_type = other DNA
                    organism = synthetic construct
SEQUENCE: 15
atattgcata tgaccccgaa acgcccgcgc ggccgcccga aaaaaggcgg cagcggcggc    60
atgcgtgagc aagggcgagg agc                                            83

SEQ ID NO: 16       moltype = DNA   length = 84
FEATURE             Location/Qualifiers
misc_feature        1..84
                    note = P16-HMG-eGFP
source              1..84
                    mol_type = other DNA
                    organism = synthetic construct
```

```
SEQUENCE: 16
atattgggat ccttagccgc cgctgccgcc ttttttcggg cggccgcgcg ggcgtttcgg   60
ggtcttgtac agctcgtcca tgcc                                          84

SEQ ID NO: 17           moltype = AA  length = 139
FEATURE                 Location/Qualifiers
REGION                  1..139
                        note = histone-like nucleoid-structuring
source                  1..139
                        mol_type = protein
                        organism = unidentified
SEQUENCE: 17
HMMSEALKIL NNIRTLRAQA RECTLETLEE MLEKLEVVVN ERREEESAAA AEVEERTRKL   60
QQYREMLIAD GIDPNELLNS LAAVKSGTKA KRAQRPAKYS YVDENGETKT WTGQGRTPAV  120
IKKAMDEQGK SLDDFLIKQ                                               139

SEQ ID NO: 18           moltype = AA  length = 11
FEATURE                 Location/Qualifiers
REGION                  1..11
                        note = high mobility group
source                  1..11
                        mol_type = protein
                        organism = unidentified
SEQUENCE: 18
TPKRPRGRPK K                                                        11

SEQ ID NO: 19           moltype = AA  length = 628
FEATURE                 Location/Qualifiers
REGION                  1..628
                        note = breast cancer 1
source                  1..628
                        mol_type = protein
                        organism = unidentified
SEQUENCE: 19
VESNIEDKIF GKTYRKKASL PNLSHVTENL IIGAFVTEPQ IIQERPLTNK LKRKRRPTSG   60
LHPEDFIKKA DLAVQKTPEM INQGTNQTEQ NGQVMNITNS GHENKTKGDS IQNEKNPNPI  120
ESLEKESAFK TKAEPISSSI SNMELELNIH NSKAPKKNRL RRKSSTRHIH ALELVVSRNL  180
SPPNCTELQI DSCSSSEEIK KKKYNQMPVR HSRNLQLMEG KEPATGAKKS NKPNEQTSKR  240
HDSDTFPELK LTNAPGSFTK CSNTSELKEF VNPSLPREEK EEKLETVKVS NNAEDPKDLM  300
LSGERVLQTE RSVESSSISL VPGTDYGTQE SISLLEVSTL GKAKTEPNKC VSQCAAFENP  360
KGLIHGCSKD NRNDTEGFKY PLGHEVNHSR ETSIEMEESE LDAQYLQNTF KVSKRQSFAP  420
FSNPGNAEEE CATFSAHSGS LKKQSPKVTF ECEQKEENQG KNESNIKPVQ TVNITAGFPV  480
VGQKDKPVDN AKCSIKGGSR FCLSSQFRGN ETGLITPNKH GLLQNPYRIP PLFPIKSFVK  540
TKCKKNLLEE NFEEHSMSPE REMGNENIPS TVSTISRNNI RENVFKEASS SNINEVGSST  600
NEVGSSINEI GSSDENIQAE LGRNRGPK                                    628
```

FLOURESCENT PROTEIN COMPOSITION FOR DNA SEQUENCE ANALYSIS AND METHOD FOR DNA SEQUENCE ANALYSIS USING SAME

CROSS-REFERENCE TO RELATED APPLICATION

This application is a divisional application of U.S. application Ser. No. 16/427,438, filed on 31 May 2019, which claims priority to Korean Patent Application No. 10-2018-0161115, filed on Dec. 13, 2018, the entire contents of which are incorporated herein by reference.

FIELD

The present disclosure relates to a composition for DNA sequence analysis and a method for DNA sequence analysis using the same and, specifically, to a composition containing a DNA-binding fluorescent protein and a method for DNA sequence analysis, the method comprising treating a sample with the same.

BACKGROUND

Direct visualization of individual DNA molecules is very important because it allows for understanding biochemical events within the context of DNA sequences. Although sequencing technology at the single nucleotide level has advanced, biological problems still remain unsolved, which are limited by short read length and information loss within a large genome.

The ultimate goal of DNA analysis would be to acquire nucleotide sequences and epigenetic information directly from chromosomal DNA without fragmentation or amplification. Given these concerns, single DNA molecules are a promising platform to overcome limitations of current sequencing technology.

In this regard, optical mapping, which is a technique for gaining genetic information by visualizing a large DNA molecule, has been continually developed. This technique is a method to make barcode-like patterns from a single DNA molecule for visualization.

Meanwhile, conventional analysis methods using sequence-specific restriction enzymes retain the fundamental problem of DNA cleavage. Analysis methods using sequence-specific substances for A/T base pairs (Netropsin, etc.) and fluorescent dye markers raises the problem that YOYO-1, used as the fluorescent dye, causes light-induced DNA cleavage.

There is therefore a need for the development of a substance that can bind in a sequence-specific manner and fluoresce alone without causing DNA cleavage.

SUMMARY

Technical Problem

The present inventors endeavored to develop a substances capable of obtaining images of genome-specific molecules at a single-DNA molecule level. As a result, the present inventors confirmed that the use of both an A/NT-specific DNA binding protein and an A/T-non-specific complementary DNA binding protein can create a sequence-specific DNA map for efficient optical identification of a single DNA molecule even without separate sequencing, and then completed the present invention.

Therefore, a purpose of the present disclosure is to provide a composition for DNA sequence analysis.

Another purpose of the present disclosure is to provide a method for DNA sequence analysis.

Technical Solution

The present inventors endeavored to develop a substances capable of obtaining images of genome-specific molecules at a single-DNA molecule level. As a result, the present inventors confirmed that the use of both an A/NT-specific DNA binding protein and an A/T-non-specific complementary DNA binding protein can create a sequence-specific DNA map for efficient optical identification of a single DNA molecule even without separate sequencing.

The present invention is directed to a composition for DNA sequence analysis and a method for DNA sequence analysis using the same.

Hereinafter, the present invention will be described in detail.

In accordance with an aspect of the present invention, there is provided a composition for DNA sequence analysis, the composition containing: an adenine/thymine (A/T)-specific DNA binding protein linked with a first fluorescent protein; and an A/T-non-specific DNA binding protein linked with a second fluorescent protein.

The first fluorescent protein and the second fluorescent protein may exhibit different colors differentiated from each other.

Specifically, the first fluorescent protein may exhibit red and the second fluorescent protein may exhibit green; the first fluorescent protein green and the second fluorescent blue; or the first fluorescent protein yellow and the second fluorescent protein sky blue.

The first fluorescent protein may be mCherry, DsRed2, mScarlet, mStrawberry, tdTomato, TagRFP, TagRFP-T, mApple, mRuby, mPlum, mKate2, mNeptune, or TagRFP657, but is not limited thereto.

The second fluorescent protein may be enhanced green fluorescent protein (eGFP), Emerald, Superfolder GFP, TagGFP2, mClover2, mClover3, mEos2, or mEos3.2, but is not limited thereto.

The adenine/thymine (A/T)-specific DNA binding protein may bind to DNA specifically to A/T nucleotide pair (W).

The A/T-specific DNA binding protein is a histone-like nucleoid-structuring (H-NS) protein or a high mobility group (HMG), but is not limited thereto.

The amino acid sequence of the histone-like nucleoid-structuring protein is represented by SEQ ID NO: 17.

The amino acid sequence of the high mobility group is represented by SEQ ID NO: 18.

The A/T-non-specific DNA binding protein may bind to DNA non-specifically to A/T nucleotide pair (W).

The A/T-non-specific DNA binding protein is, but not limited to, a breast cancer 1 (BRCA1) protein or a protein having a structure of chemical formula 1 below:

$$(XY)_n, \quad \text{[Chemical Formula 1]}$$

wherein X and Y each may be independently any amino acid independently selected from lysine (K), tryptophane (W), or derivatives thereof; and
wherein n may be an integer of 1 to 5.

The amino acid sequence of the BRCA1 protein is represented by SEQ ID O: 19.

The fluorescent protein (first or second fluorescent protein) and the DNA binding protein (A/T-specific or A/T-non-specific DNA binding protein) may be linked with to each other via a linker. Various kinds of linkers that can link a DNA binding protein and a fluorescent protein may be used according to the kind of fluorescent protein.

The linker may be a peptide linker comprising at least two amino acids selected from the group consisting of glycine (G), serine (S), lysine (K), and alanine (A).

The linker sequence may be, for example, GGSGG, but is not limited thereto.

The first fluorescent protein (or the second fluorescent protein) may be located at the N-terminal or C-terminal of the A/T-specific DNA binding protein (or A/T-non-specific DNA binding protein), or may be located at both the N-terminal and C-terminal thereof.

The A/T-specific DNA binding protein linked with the first fluorescent protein and the A/T-non-specific DNA binding protein linked with the second fluorescent protein may be contained at a concentration ratio of 1:1-20, 1:1-10, 1:2-10, 1:3-10, 1:4-10, 1:5-10, 1:1-9, 1:1-8, 1:1-7, 1:1-6, 1:1-5, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20.

The DNA may be for example, a single DNA molecule, oligo DNA, a chromosome, a polytenechromosome, and a chromatin fiber, but is not limited thereto.

In the composition, the A/T-specific DNA binding protein linked with the first fluorescent protein preferentially binds to an A/T-rich region of DNA, so that efficient optical identification of a single DNA molecule can be attained by linking both an A/T-specific DNA binder agent and a A/T-non-specific complementary DNA binder agent to DNA.

Furthermore, the composition can analyze chemically modified or damaged DNA backbone, unlike conventional sequencing, and thus can be helpfully used at a single-DNA molecule level.

In accordance with another aspect of the present invention, there is provided a method for DNA sequence analysis, the method including treating a sample with a composition for DNA sequence analysis, the composition containing: an adenine/thymine (A/T)-specific DNA binding protein linked with a first fluorescent protein; and an A/T-non-specific DNA binding protein linked with a second fluorescent protein.

The method may further include comparing the adenine/thymine (A/T) frequency of the entire genome of an analysis target and the A/T frequency of the sample treated with the composition.

The sample may be, for example, a single DNA molecule, oligo DNA, a polytenechromosome, and a chromatin fiber, but is not limited thereto.

In the method, the DNA sequence of the analysis target can be analyzed by scanning the entire genomic A/T frequency of the analysis target in silico map using a Python program and searching the most suitable alignment position between an image of the sample treated with the composition for DNA sequence analysis and the scanned entire genome A/T frequency.

The overlapping description of the composition is omitted considering the complexity of the present specification.

Advantageous Effects

The present invention is directed to a composition for DNA sequence analysis and a method for DNA sequence analysis, the method comprising treating a sample with the composition. The composition of the present invention can attain efficient optical identification at a single-DNA molecule level by linking both an A/T-specific DNA-binder agent and an A/T-non-specific complementary DNA-binder agent to DNA, and thus can be helpfully used in studying chromosomal organization of genomes, protein immunolocalization, and the like.

Especially when the composition is a fluorescent protein having DNA binding ability, the composition facilitates production and induces mutations after the construction of genes, and thus has an advantage that various new properties can be imparted.

BRIEF DESCRIPTION OF THE DRAWINGS

i) H-NS-mCherry and BRCA1-eGFP, ii) H-NS-mCherry and 2(KW)$_2$-eGFP, iii) 2HMG-mCherry and BRCA1-eGFP, iv) 2HMG-mCherry and 2(KW)$_2$-eGFP, v) H-NS-mCherry and 2HMG-eGFP, and vi) 2(KW)$_2$-mCherry and BRCA1-eGFP.

i) H-NS-mCherry and BRCA1-eGFP, ii) H-NS-mCherry and 2(KW)$_2$-eGFP, iii) 2HMG-mCherry and BRCA1-eGFP, and iv) 2HMG-mCherry and 2(KW)$_2$-eGFP.

DETAILED DESCRIPTION

Hereinafter, the present invention will be described in more detail with reference to examples. These examples are only for illustrating the present invention more specifically, and it will be apparent to those skilled in the art that the scope of the present invention is not limited by these examples.

Test Materials and Reagents

DNA primers were purchased from Cosmogenetech (Korea). Biotin-labeled DNA oligomers were purchased from Bioneer (Korea). *E. coli* BL21 (DE3) strain was purchased from Yeastern (Taiwan). λ DNA(NC_001416.1, 48,502 bp) and single-stranded M13mp18 (7,249 bp) were purchased from New England Biolabs (US). Epoxy was purchased from Devcon (US). N-trimethoxymethyl silyl propyl-N,N,N-trimethyl ammonium chloride (50% methanol) was purchased from Gelest (Morrisville, US). Ni-NTA agarose resin and column were purchased from Qiagen (Venlo, Netherlands). Unless note, all enzymes were purchased from NEB, and all reagents were purchased from Sigma-Aldrich.

Fluorescence Microscopy and DNA Visualization

An inverted optical microscope (Olympus IX70, Japan) was equipped with 60× and 100× Olympus UPlanSApo oil immersion objectives, and a LED light source (SOLA SM II light engine, Lumencor, US) was used. The light was condensed through corresponding filter sets (Semrock, US) to set excitation and emission wavelengths.

Fluorescence microscopic images were stored in a 16-bit TIFF format through an electron-multiplying charge-coupled device (EMCCD) digital camera device (Evolve EMCCD, Roper Scientific, US), and the software Micro-manager was used. For image processing and analysis, the Java plug-in and python programs developed by the present inventors and ImageJ software were used.

Python Program imageCompare.py: a library of functions.
    seq2map.py: converts a FASTA sequence file in silico map into an image with high frequency portions in white and low frequency portions in black.
    insilicoMapFolder.py: scans and compares the in silico image file and the DNA image obtained from experiments for all images in a folder, and returns the position and value of a point with the highest cross-correlation coefficient, which are then stored in a new record file.
    sortView.py: reads the record file obtained by insilicoMapFolder.py to visualize signal comparison, cross-correlation coefficient search, and image comparison and create the same in a new window.
    randomtiff.py: creates tiff images having random brightness values.

Preparation of Fluorescent Protein-DNA Binding Protein

Plasmids necessary for protein production were constructed by overlap extension polymerase chain reaction (OE-PCR), which links a fluorescent protein to the C-terminal of DNA binding protein. The GGSGG linker containing glycine and serine was used, and respective primer sequences are shown in Table 1.

HNS-mCherry: H-NS DNA was amplified using forward primer P1-HNS and reverse primer P2-HNS while DNA plug of *E. coli* MG1655 strain was used as template. mCherry DNA was amplified using the forward primer P3-mCherry and the reverse primer P4-mCherry. Then, H-NS and mCherry were linked with each other by overlap polymerase chain reaction.
    BRCA1-eGFP: BRCA1-DNA binding domain was amplified using the forward primer P5-BRCA and the reverse primer P6-BRCA while partial BRCA1 (Addgene plasmid #71116) including 452-1079 residues was used as a template. eGFP DNA was amplified using the forward primer P7-eGFP and the reverse primer P8-eGFP. Then, BRCA1 DNA binding domain and eGFP were linked with each other by overlap polymerase chain reaction.
    2HMG-mCherry: 2HMG-mCherry was constructed by tagging DNA binding sites to each terminal of mCherry while the forward primer P9-HMG-mCherry and the reverse primer P10-HMG-mCherry were used.
    2(KW)$_2$-mCherry: 2(KW)$_2$-mCherry was constructed by tagging DNA binding sites to each terminal of mCherry while the forward primer P11-(KW)$_2$-mCherry and the reverse primer P12-(KW)$_2$-mCherry were used.
    2(KW)$_2$-eGFP: 2(KW)$_2$-eGFP was constructed by tagging DNA binding sites to each terminal of eGFP while the forward primer P13-(KW)$_2$-eGFP and the reverse primer P14-(KW)$_2$-eGFP were used.
    2HMG-eGFP: 2HMG-eGFP was constructed by tagging DNA binding sites to each terminal of eGFP while the forward primer P15-HMG-eGFP and the reverse primer P16-HMG-eGFP were used.

TABLE 1

| SEQ ID NO | Name | Sequence (5'-3') |
|---|---|---|
| 1 | P1-HNS | ACTTCACATATGATGAGCGAAGCACTTAAAATTCTG |
| 2 | P2-HNS | GCCACCAGAACCACCTTGCTTGATCAGGAAATCGTCG |
| 3 | P3-mCherry | CAAGCAAGGTGGTTCTGGTGGCATGGTGAGCAAGGGCGAGGAG |
| 4 | P4-mCherry | ATTTCAGGATCCCTACTTGTACAGCTCGTCCATGCC |
| 5 | P5-BRCA | TATGCACATATGGTAGAGAGTAATATTGAAGACAAAATATTTGGG |
| 6 | P6-BRCA | GCTCACCATACCGCCGCTGCCACCTTTTGGCCCTCTGTTTCTACCTAG |
| 7 | P7-eGFP | GGTGGCAGCGGCGGTATGGTGAGCAAGGGCGAGGAG |
| 8 | P8-eGFP | TATGCAGGATCCTTACGCCTTGTACAGCTCGTCCATG |
| 9 | P9-HMG-mCherry | ATATTGCATATGACCCCGAAACGCCCGCGCGGCCGCCCGAAAAAAGGCGGCAGCGGCGGC/ATGGTGAGCAAGGGCGAGGAG |
| 10 | P10-HMG-mCherry | ATATTGGGATCCTTAGCCGCCGCTGCCGCCTTTTTTCGGGCGGCCGCGCGGGCGTTTCGGGGT/CTTGTACAGCTCGTCCATGCC |

TABLE 1-continued

| SEQ ID NO | Name | Sequence (5'-3') |
|---|---|---|
| 11 | P11-(KW)$_2$-mCherry | ATGTTGCATATGAAATGGAAATGGAAAAAAGCGATGGTGAGCAAGGGCGAGGAG |
| 12 | P12-(KW)$_2$-mCherry | ATGTTGGGATCCTTATTTCCATTTCCATTTTTTCGCCTTGTACAGCTCGTCCATGCC |
| 13 | P13-(KW)$_2$-eGFP | ATGTTGCATATGAAATGGAAATGGAAAAAAGCGATGCGTGAGCAAGGGCGAGGAGC |
| 14 | P14-(KW)$_2$-eGFP | ATGTTGGGATCCTTATTTCCATTTCCATTTTTTCGCCTTGTACAGCTCGTCCATGCC |
| 15 | P15-HMG-eGFP | ATATTGCATATGACCCCGAAACGCCCGCGCGGCCGCCCGAAAAAAGGCGGCAGCGGCGGCATGCGTGAGCAAGGGCGAGGAGC |
| 16 | P16-HMG-eGFP | ATATTGGGATCCTTAGCCGCCGCTGCCGCCTTTTTCGGGCGGCCGCGCGGGCGTTTCGGGGTCTTGTACAGCTCGTCCATGCC |

Molecular Cloning

Using standard subcloning procedures, fluorescent protein-DNA binding protein sequences were inserted into the pET-15b vector and transformed into the E. coli BL21 (DE3) strains by using NdeI and BamHI. A single colony of the transformed cells was inoculated in fresh LB media containing ampicillin and incubated for 1 h.

After transformed cells were saturated, the cells were incubated to an optical density of about 0.8 at 37° C. with corresponding antibiotics. Fluorescent tagging proteins were overexpressed overnight with a final concentration of 1 mM for IPTG on a shaker at 20° C. and 250 rpm.

Cells for protein purification were harvested by centrifugation at 12,000×g, for 10 min (following centrifugations were all performed under similar conditions), and the residual media was washed with the cell lysis buffer (50 mM Na2HPO4, 300 mM NaCl, 10 mM Imidazole, pH 8.0). The cells were lysed by ultrasonication for 30 min and cell debris were centrifuged at 13,000 rpm for 10 min at 4° C. His-tagged FP-DNA binding proteins were purified using affinity chromatography with Ni-NTA agarose resin.

The mixture of cell protein and resin was kept on a shaking platform at 4° C. for 1 h. The lysate containing proteins bound Ni-NTA agarose resin was loaded onto the column for gravity chromatography and was washed several times using the protein washing buffer (50 mM Na$_2$HPO$_4$, 300 mM NaCl, 20 mM Imidazole, pH 8.0). Especially for H-NS-mCherry, a washing buffer containing 35 mM Imidazole (50 mM Na$_2$HPO$_4$, 300 mM NaCl, 35 mM Imidazole, pH 8.0) was used.

Finally, the bound proteins were eluted using a protein elution buffer (50 mM Na$_2$HPO$_4$, 300 mM NaCl, 250 mM imidazole, pH 8.0). All proteins were diluted (10 μg/mL) using 50% w/w glycerol/1×TE buffer (Tris 10 mM, EDTA 1 mM, pH 8.0).

Preparation of Coverslips and Modified Surfaces

Glass coverslips were inserted into the Teflon rack, and soaked in piranha etching solution (30:70 v/v H$_2$O$_2$/H$_2$SO$_4$) for 2 h, and then washed with deionized water until the pH reached the neutral (pH 7).

For positively-charged glass surfaces, 350 μL of N-trimethoxymethylsilylpropyl-N,N,N-trimethyl ammonium chloride dissolved in 50% methanol was mixed with 200 mL of deionized water.

To prepare glass surface for DNA tethering, 2 mL of N-[3-(trimethoxysilyl)propyl] ethylenediamine was added to 200 mL of methanol and 10 mL of glacial acetic acid to add primary amino groups. The glass coverslips were incubated in the solution for 30 min, sonicated for 15 min, and then incubated for 12 h at room temperature. Then, the coverslips were washed with methanol and ethanol.

Preparation of Microfluidic Devices

To investigate DNA elongation and deposition on positively charged surfaces, polydimethylsiloxane (PDMS) microfluidic devices were manufactured employing a standard rapid phototyping method.

More specifically, the patterns on a silicon wafer for microchannels (4 μm high and 100 μm wide) were fabricated using SU-8 2005 photoresist (Microchem, US). The PDMS pre-polymer mixed with a curing agent (10:1 weight ratio) was cast on the patterned wafer and cured at 65° C. for 4 h or longer. The cured PDMS was peeled off from the patterned wafer, and the PDMS devices were treated in an air plasma generator for 1 min with 100 W (Femto Science Cute Basic, Korea) to make PDMS surface hydrophilic. The PDMS devices were stored in water and air-dried before use.

Experimental Example 1: Confirmation of DNA Staining at Single-Molecule Level

A composition for DNA sequence analysis was prepared by mixing 50 μL of 8 nM H-NS-mCherry and 50 μL of 40 nM BRCA1-eGFP at a ratio of 1:1.

First, 10 μL of a solution obtained by diluting λ DNA to 15 ng/μL with 1×TE (10 mM Tris, 1 mM EDTA, pH 8) was mixed with 10 μL of the composition for DNA sequence analysis. After incubation at room temperature for a while, the mixture was diluted with 1×TE solution to 1/10-1/20, and then loaded at the entrance of a structure with a positively charged glass surface and a PDMS microchannel (100 μm×4 μm). Thereafter, DNA molecules were imaged on the microscope.

Figure 1A:
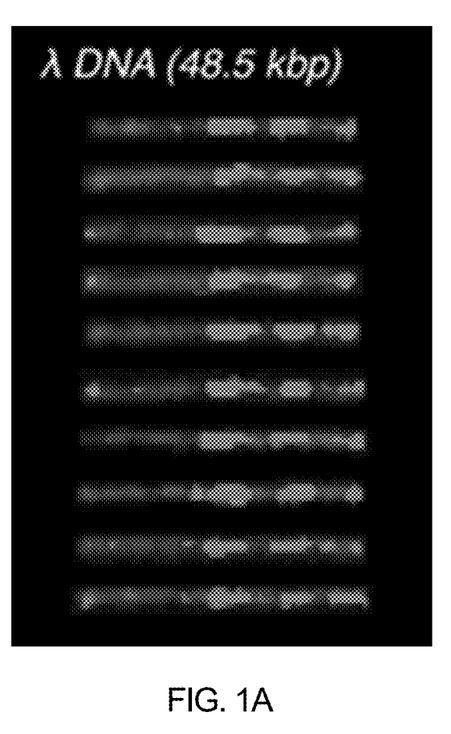
FIG. 1A schematically shows stained DNA molecules according to an embodiment of the present invention, and specifically, A DNA molecules stained with H-NS-mCherry and BRCA1-eGFP.

As can be confirmed in FIG. 1A, as a result of staining of λ DNA using H-NS-mCherry and BRCA1-eGFP, λ DNA molecules could be aligned based on three distinct red spots on a green DNA backbone.

Next, 3 μL of a solution obtained by diluting λ DNA to 1/10-1/20 with the 1×TE solution was dropped on the positively charged glass surface, which was then brought in contact with a slide glass to spread the solution, and imaged by a fluorescence microscope.

Figure 1B:
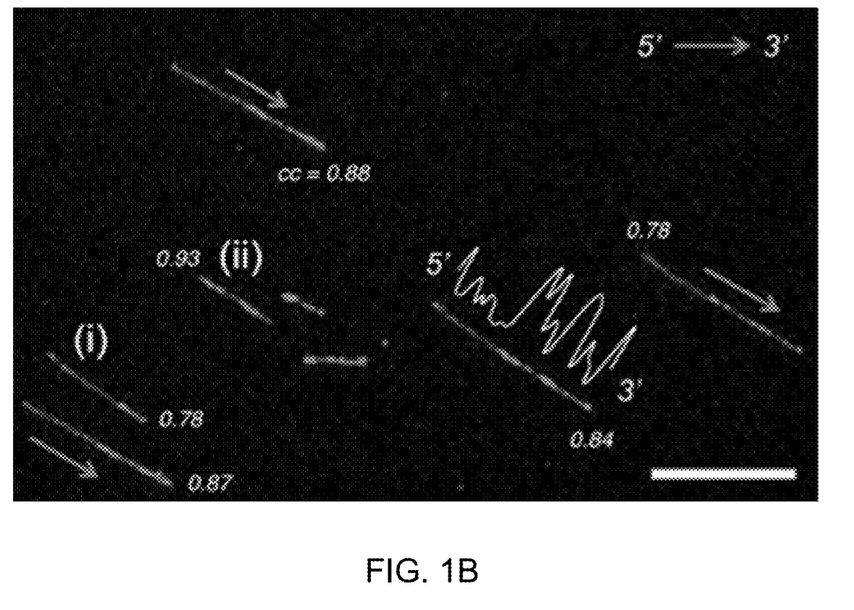
FIG. 1B shows stained DNA molecules according to an embodiment of the present invention. The arrows indicate molecular orientations of 5' to 3'; the white profile indicates the A/T frequency of λ DNA (scale bar: 10 μm), and respective numerical values indicate cross-correlation values (cc).

As can be confirmed in FIG. 1B, λ DNA molecules were deposited on the positively charged surface. The alignment orientations of the randomly aligned DNA molecules can be obtained, and even in the case of the middle-broken DNA molecules but not the full molecule, the position information of corresponding fragments can be obtained.

Experimental Example 2: Confirmation of Optimal Concentration of Fluorescent Protein—DNA Binding Protein H-NS-mCherry at various concentrations (1, 2, 4, 8, or 16 nM) was mixed with BRCA1-eGFP (0, 10, or 20 nM) to prepare compositions for DNA sequence analysis, and λ DNA was visualized using PDMS microchannels by the method in Experimental Example 1".

Figure 2:
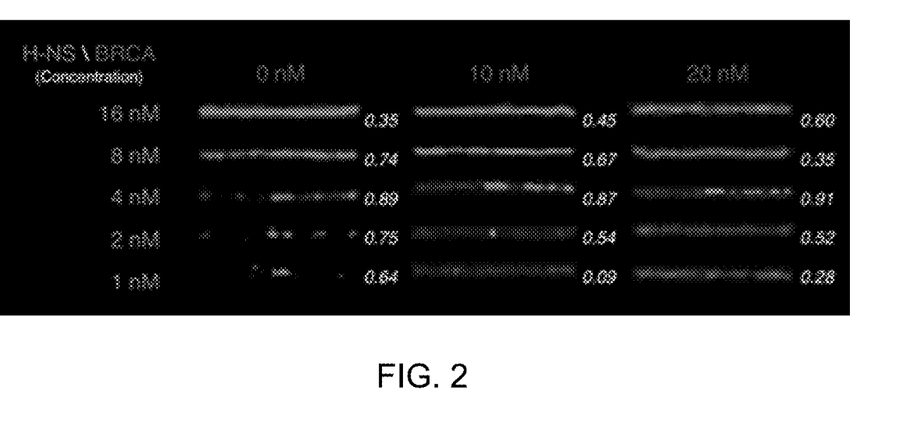
FIG. 2 shows λ DNA molecules stained with H-NS-mCherry and BRCA1-eGFP at various concentrations according to an embodiment of the present invention. Respective numerical values indicate cross-correlation values (cc).

As can be confirmed in FIG. 2, the stained DNA color pattern was varied according to the concentration of the fluorescent protein-DNA binding protein.

More specifically, the use of 1 nM H-NS-mCherry and 20 nM BRCA1-eGFP generated a full green DNA molecule, but in contrast, the use of 16 nM H-NS-mCherry and 10 nM BRCA1-eGFP generated a full red DNA molecule. The optimal concentration was shown at the ratio of 4 nM H-NS-mCherry and 20 nM BRCA1-eGFP (the cc value is 0.91: the cross-correlation coefficient (hereinafter, cc) was evaluated by using the following equation).

$$cc = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

(n=number of samples; $x_i$, $y_i$=value at each point; and $\bar{x}$, $\bar{y}$=average of samples)

Meanwhile, the use of only H-NS-mCherry generated nucleotide sequence (A/T)-specific color patterns at 4 nM or lower. These results indicate that H-NS-mCherry stains A/T-rich regions and BRCA1-eGFP complementarily stains the parts of DNA, which were not stained by H-NS-mCherry.

Experimental Example 3: Confirmation of Various Combinations of Fluorescent Protein-DNA Binding Protein On the basis of mCherry and eGFP fluorescent proteins, various combinations of fluorescent protein-DNA binding protein (H-NS-mCherry, BRCA1-eGFP, 2HMG-mCherry, 2(KW)$_2$-mCherry, 2(KW)$_2$-eGFP, 2HMG-eGFP) were used to produce compositions for DNA sequence analysis. λ DNA was visualized using positively charged glass surface by the method in Experimental Example 1.

Figure 3A:
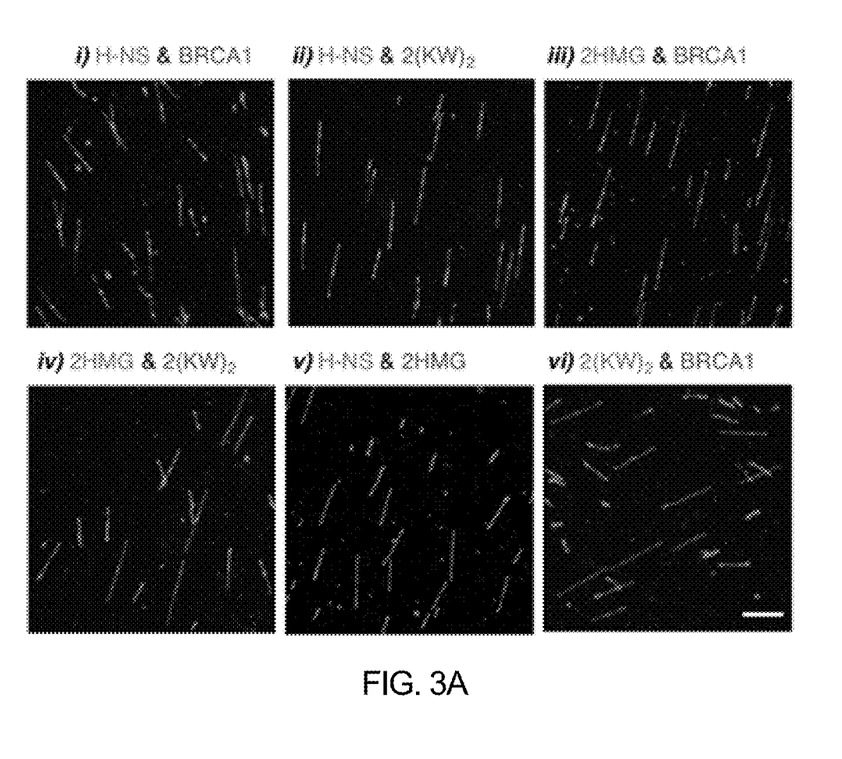
FIG. 3A shows λ DNA molecules stained with various combinations of fluorescent protein-DNA binding protein according to an embodiment of the present invention. The respective combinations are shown below (scale bar: 10 μm)
Figure 3B:
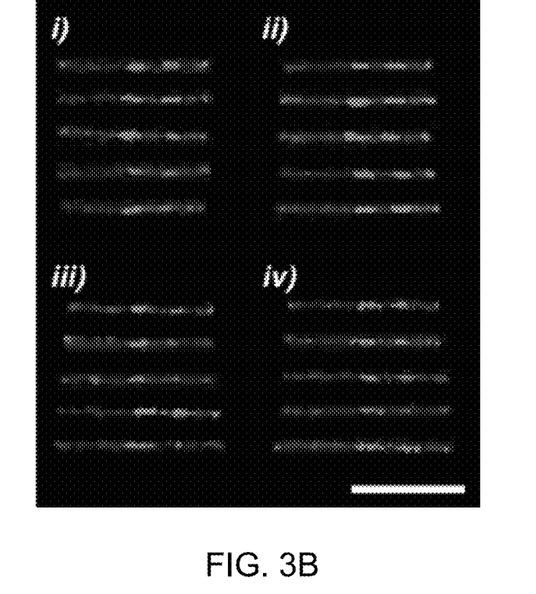
FIG. 3B shows λ DNA molecules stained with various combinations of fluorescent protein-DNA binding protein according to an embodiment of the present invention. The respective combinations are shown below (scale bar: 10 μm)
Figure 3C:
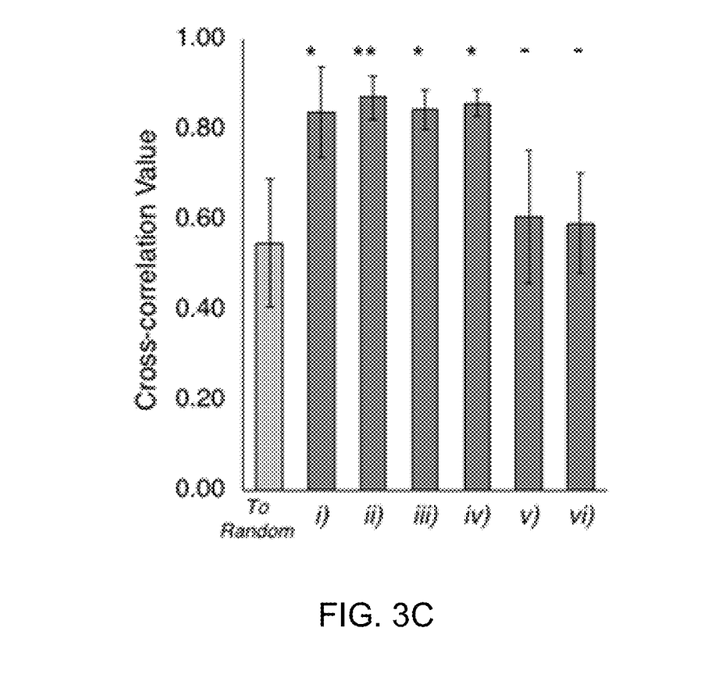
FIG. 3C is a graph showing cross-correlation values of λ DNA molecules stained with various combinations of fluorescent protein-DNA binding protein according to an embodiment of the present invention (Random: 0.55±0.14, ii: 0.84±0.10, 0.87±0.05, iii: 0.84±0.04, iv: 0.86±0.03, v: 0.61±0.15, and vi: 0.59±0.11) (*p<0.02, **p<0.005).

As can be confirmed in FIGS. 3A and 3B, four (I, ii, iii, and iv) out of six combinations generated A/T-specific A genome patterns. On the contrary, random patterns (cc=0.61) were generated when both of the DNA binding proteins employ A/T-specific DNA binding proteins (H-NS and 2HMG) (v), and random patterns (cc=0.59) were also generated when both of the DNA binding proteins employ A/T-non-specific DNA binding proteins (BRCA1 and 2(KW)$_2$) (vi).

Experimental Example 4. Confirmation of DNA Staining at Short-DNA Fragment Level It was further investigated with reference to the above example results whether the composition of the present invention was applicable in short DNA fragments, such as M13, a bacteriophage that infects bacteria, and murine leukemia virus (MLV), a retrovirus that infects mice.

More specifically, as for the M13 phage genome, the double-stranded M13mp18 was synthesized from single-stranded circular DNA by Top polymerase reaction with a primer (GGAAACCGA GGAAACGCAATAATAACG-GAATACCC). After the polymerase reaction, the double-stranded circular DNA was linearized by PstI. The double-stranded retroviral genomic DNA was synthesized from murine leukemia virus genome. After the reaction, the circular dsDNA was linearized by BmtI.

Each viral DNA was visualized, by the method in Experimental example 1, using the composition for DNA sequence analysis in which 50 μL of 8 nM H-NS-mCherry and 50 μL of 40 nM BRCA1-eGFP were mixed at a ratio of 1:1.

Figure 4:
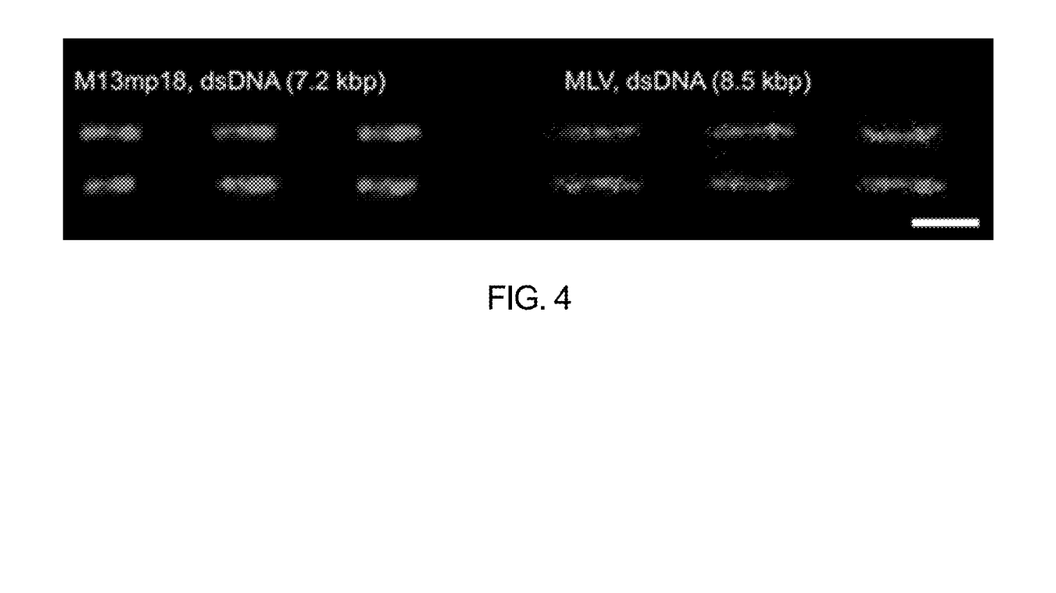
FIG. 4 schematically shows viral genomic DNA molecules stained with H-NS-mCherry and BRCA1-eGFP according to an embodiment of the present invention (scale bar: 5 μm).

As can be confirmed in FIG. 4, the linearized DNA molecules were two-color stained to generate genome-specific patterns. It was confirmed that M13 DNA and MLV DNA could be differentiated from each other based on such image patterns.

CONCLUSION

From the integration of the description, it could be confirmed that, by using a combination of two complementary color fusion proteins, the composition of the present invention specifically stains DNA AT-rich regions, and shows an AT-rich sequence-specific fluorescence intensity pattern on the DNA backbone when binding to DNA. The use of such sequence-specific patterns, when the full sequences are provided, can determine DNA sequences from microscopic images of stained DNA, and therefore, the composition of the present invention can be helpfully used in the high-rate and high-efficiency analysis of giant single DNA molecules.

This application contains references to amino acid sequences and/or nucleic acid sequences which have been submitted concurrently herewith as the sequence listing XML file entitled "000165usdva SequenceListing.XML", file size 25.5 kilobytes (KB), created on 31 Aug. 2022. The aforementioned sequence listing is hereby incorporated by reference in its entirety pursuant to 37 C.F.R. § 1.52(e)(5).

What is claimed is:

1. A composition for DNA sequence analysis, the composition comprising:

an adenine/thymine (A/T)-specific DNA binding protein linked with a first fluorescent protein; and an A/T-non-specific DNA binding protein linked with a second fluorescent protein;

wherein the A/T-specific DNA binding protein is a histone-like nucleoid-structuring (H-NS) protein or a high mobility group (HMG);

wherein the A/T-non-specific DNA binding protein is a breast cancer 1 (BRCA1) protein or a protein having a structure of Chemical Formula 1 below:

$$(XY)_n,\qquad\text{[Chemical Formula 1]}$$

wherein X and Y each are independently any amino acid independently selected from lysine (K), tryptophan (W); and wherein n is an integer of 1 to 5, wherein the concentration ratio of the A/T-specific DNA binding protein linked with the first fluorescent protein and the A/T-non-specific DNA binding protein linked with the second fluorescent protein is 1:2-5.

2. The composition of claim 1, wherein the first fluorescent protein and the second fluorescent protein exhibit different colors.

3. The composition of claim 1, wherein the first fluorescent protein is mCherry.

4. The composition of claim 2, wherein the first fluorescent protein is mCherry.

5. The composition of claim 1, wherein the second fluorescent protein is enhanced green fluorescent protein (eGFP).

6. The composition of claim 2, wherein the second fluorescent protein is enhanced green fluorescent protein (eGFP).

* * * * *